(12) United States Patent
Tseng

(10) Patent No.: US 8,558,851 B1
(45) Date of Patent: *Oct. 15, 2013

(54) OPTIMIZING DISPLAY ORIENTATION

(75) Inventor: Erick Tseng, San Francisco, CA (US)

(73) Assignee: Google Inc., Mountain View, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 13/249,562

(22) Filed: Sep. 30, 2011

Related U.S. Application Data

(63) Continuation of application No. 12/938,072, filed on Nov. 2, 2010, now Pat. No. 8,471,869.

(51) Int. Cl.
*G09G 5/20* (2006.01)

(52) U.S. Cl.
USPC .......................................... 345/649; 345/619

(58) Field of Classification Search
CPC .............................................. G09G 2340/0492
USPC ................................................... 345/649, 619
See application file for complete search history.

(56) References Cited

U.S. PATENT DOCUMENTS

| | | | | |
|---|---|---|---|---|
| 4,525,784 | A * | 6/1985 | Hamel et al. ...................... | 701/1 |
| 5,701,259 | A * | 12/1997 | Dittrich ........................... | 702/92 |
| 6,109,370 | A * | 8/2000 | Gray ............................... | 175/61 |
| 7,365,734 | B2 * | 4/2008 | Fateh et al. ..................... | 345/156 |
| 2004/0245334 | A1 * | 12/2004 | Sikorski ......................... | 235/383 |
| 2006/0227047 | A1 * | 10/2006 | Rosenberg ................ | 342/357.13 |
| 2006/0238194 | A1 * | 10/2006 | Gleich ............................ | 324/309 |
| 2007/0129909 | A1 * | 6/2007 | Kusuda et al. ................. | 702/141 |
| 2009/0239586 | A1 * | 9/2009 | Boeve et al. ................... | 455/566 |
| 2009/0300537 | A1 * | 12/2009 | Park ............................... | 715/778 |
| 2010/0007603 | A1 * | 1/2010 | Kirkup ........................... | 345/158 |
| 2010/0031186 | A1 * | 2/2010 | Tseng et al. ................... | 715/786 |
| 2010/0191459 | A1 * | 7/2010 | Carter et al. ................... | 701/208 |
| 2010/0304720 | A1 * | 12/2010 | Lucero et al. ............... | 455/414.1 |
| 2010/0312519 | A1 * | 12/2010 | Huang et al. .................. | 702/150 |
| 2010/0330940 | A1 * | 12/2010 | Sheynblat et al. ............ | 455/129 |
| 2011/0098918 | A1 * | 4/2011 | Siliski et al. .................. | 701/201 |
| 2011/0106534 | A1 * | 5/2011 | LeBeau et al. ................ | 704/235 |
| 2011/0131825 | A1 * | 6/2011 | Mayor et al. .................... | 33/356 |
| 2011/0148935 | A1 * | 6/2011 | Arrasvuori .................... | 345/676 |
| 2011/0163917 | A1 * | 7/2011 | Lundgren et al. ............. | 342/463 |
| 2011/0176720 | A1 * | 7/2011 | Van Osten et al. ............ | 382/154 |
| 2011/0178702 | A1 * | 7/2011 | Lassesson et al. ............ | 701/207 |
| 2011/0221664 | A1 * | 9/2011 | Chen et al. ..................... | 345/156 |

(Continued)

OTHER PUBLICATIONS

JCN Newswire, "Asahi Kasei Announces World (sic) Smallest 3-axis Electronic Compass", Bloomberg (Mar. 16, 2007) [retrieved on Jul. 19, 2011]. Retrieved from the Internet: http://www.bloomberg.com/apps/news?pid=newsarchive&sid=afPV_cj3DAjQ, 4 pages.

(Continued)

*Primary Examiner* — Javid A Amini
(74) *Attorney, Agent, or Firm* — Fish & Richardson P.C.

(57) ABSTRACT

An accelerometer of a mobile computing device is operable to provide a first input to an orientation module of the device. The orientation module is configured to use multiple signals to determine a spatial orientation of the device. A magnetometer of the device is operable to provide a second input to the orientation module. The orientation module is operable to receive the first input from the accelerometer and the second input from the magnetometer, and to determine an orientation of the device based on a combination of the first input and the second input.

15 Claims, 8 Drawing Sheets

(56) References Cited

U.S. PATENT DOCUMENTS

| | | | |
|---|---|---|---|
| 2011/0239026 A1* | 9/2011 | Kulik | 713/324 |
| 2011/0251892 A1* | 10/2011 | Laracey | 705/14.51 |
| 2011/0252057 A1* | 10/2011 | Huang et al. | 707/770 |
| 2011/0252344 A1* | 10/2011 | van Os | 715/763 |
| 2011/0256881 A1* | 10/2011 | Huang et al. | 455/456.1 |
| 2011/0260921 A1* | 10/2011 | Harrat et al. | 342/386 |
| 2011/0261187 A1* | 10/2011 | Wang et al. | 348/113 |
| 2011/0264400 A1* | 10/2011 | Youssef et al. | 702/141 |

OTHER PUBLICATIONS

Tuck, Kimberly, "Tilt Sensing Using Linear Accelerometers", Freescale Semiconductor, Inc. (Jun. 2007) [retrieved on Jul. 19, 2011]. Retrieved from the Internet: http://www.freescale.com/files/sensors/doc/app_note/AN3461.pdf,, 8 pages.

* cited by examiner

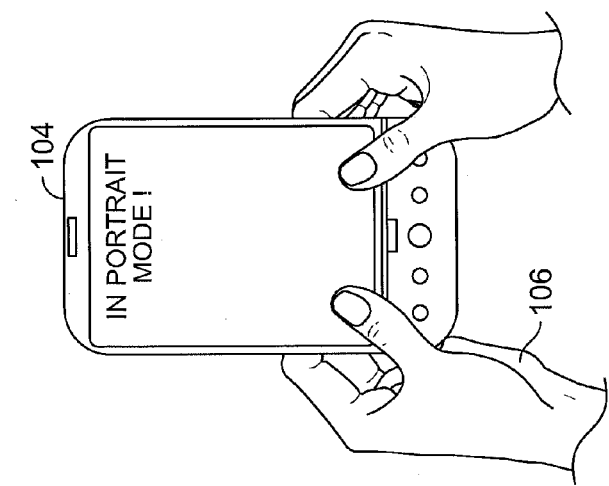
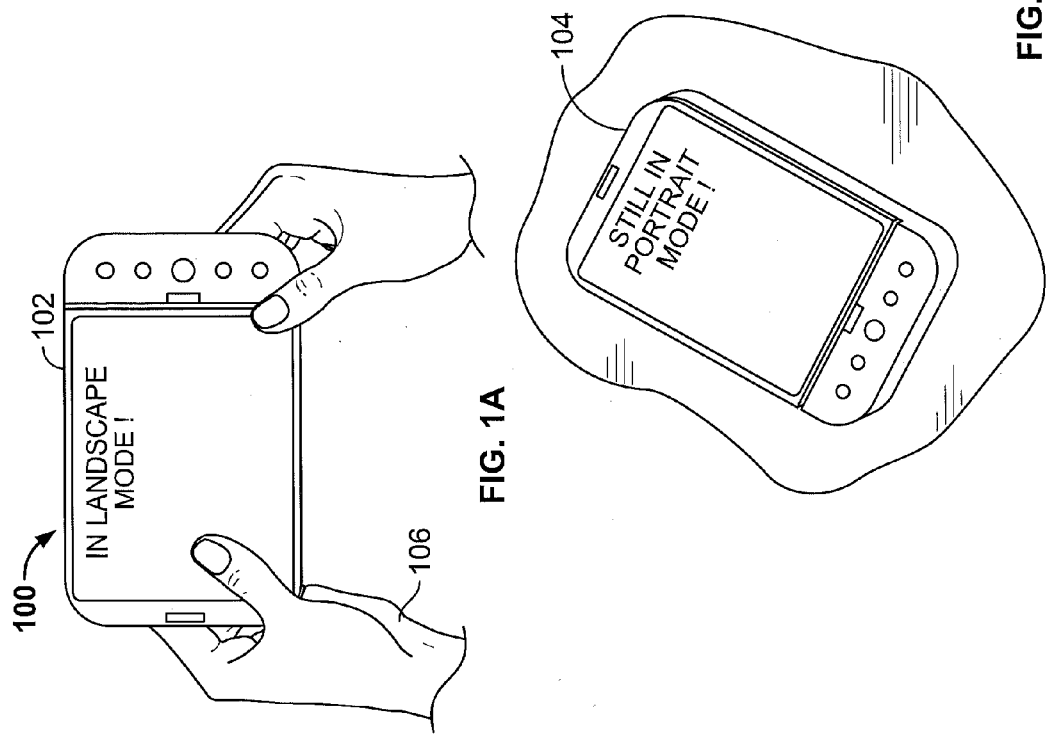

OPTIMIZING DISPLAY ORIENTATION

CROSS-REFERENCE TO RELATED APPLICATION

This application is a continuation of U.S. application Ser. No. 12/938,072, filed on Nov. 2, 2010, entitled "Optimizing Display Orientation" the entire contents of which are hereby incorporated by reference.

TECHNICAL FIELD

This document relates to determining when to automatically re-orientate a display on a mobile computing device.

BACKGROUND

The use of mobile computing devices has become increasingly widespread. Although they are portable, lightweight and small, the functionality of mobile computing devices continues to improve, and along with that, user's expectations have increased. For example, users have come to expect the display on certain mobile computing devices to automatically switch between portrait and landscape modes depending on how the user is holding the device. Anticipating when a user expects the display mode to change can be challenging.

SUMMARY

In general, in one aspect, a mobile computing device is described that includes an accelerometer, a magnetometer and an orientation module. The accelerometer is operable to provide a first input to the orientation module. The orientation module is configured to use multiple signals to determine a spatial orientation of a mobile computing device. The magnetometer is operable to provide a second input to the orientation module. The orientation module is operable to: receive the first input from the accelerometer; receive the second input from the magnetometer; and determine an orientation of the device based on a combination of the first input and the second input.

Implementations of the mobile computing device can include some, none or all of the following features. The mobile computing device can further include a display operable to display content, and a display manager operable to rotate the orientation of the displayed content based on the determined orientation of the device. The orientation module can be further operable to determine a weighting of the first input and of the second input and determine the orientation based on a combination of the weighted first and second inputs.

The orientation module can be further operable to determine an angle of incidence of an axis of the mobile computing device compared to a plane, and determine the weighting based on the angle of incidence. The plane can be a substantially vertical plane and the orientation module can be further operable to: when the angle of incidence indicates the axis is substantially horizontal, weight the second input 100%, and when the angle of incidence indicates the axis is substantially vertical, then weight the first input 100%. The plane can be a substantially vertical plane and the orientation module operable to determine the weighting can be further operable to, as the angle of incidence indicates the axis becoming increasingly vertical, increase the weighting of the first input relative to the second input. The plane can be a substantially vertical plane and the orientation module operable to determine the weighting can be further operable to, as the angle of incidence indicates the axis becoming increasingly horizontal, increase the weighting of the second input relative to the first input.

The orientation module can be further operable to determine multiple angles of incidence of an axis of the mobile computing device compared to a multiple planes corresponding to the multiple angles, and to determine the weighting based on the plurality of angles of incidence.

In general, in another aspect, methods, systems and computer-readable mediums encoded with computer program products that include instructions that, when executed, cause data processing apparatus to perform operations are described as follows. A first input is received from an accelerometer included in a mobile computing device. A second input is received from a magnetometer included in the mobile computing device. An orientation of the mobile computing device is determined based on a combination of the first and second inputs.

Implementations can include some, none or all of the following features. An orientation of content displayed on a display included on the mobile computing device can be rotated based on the orientation of the mobile computing device. Determining an orientation of the mobile computing device can include weighting the first input and the second input and determining the orientation based on a combination of the weighted first and second inputs. Weighting the first and second inputs can include determining an angle of incidence of an axis of the mobile computing device compared to a plane and determining the weighting based on the angle of incidence. The plane can be a substantially vertical plane and weighting the first input and the second input can include, when the angle of incidence indicates the axis is substantially horizontal, weighting the second input 100%. When the angle of incidence indicates the axis is substantially vertical, then the first input can be weighted 100%. As the angle of incidence indicates the axis becoming increasingly vertical, the weighting of the first input can be increased relative to the second input. As the angle of incidence indicates the axis becoming increasingly horizontal, the weighting of the second input can be increased relative to the first input.

Weighting the first input and the second input can include determining multiple angles of incidence of an axis of the mobile computing device compared to multiple planes corresponding to the multiple angles. A weighting can be determined based on the multiple of angles of incidence. Multiple first inputs can be received from the accelerometer and multiple second inputs can be received from the magnetometer at multiple angles of incidence. An accuracy of the first inputs to the second inputs in predicting an orientation of the device at multiple angles of incidence of the device can be compared and a set of weightings that correspond to the multiple angles of incidence for each of the first input and the second input can be determined based on the comparison.

The systems and techniques described can realize none, some or all of the following advantages. The orientation of a display on a mobile computing device can automatically change in response to a user's movement of the device more reliably, i.e., with less errors. Such a change can be responsive to user motions that are intuitive to the user. And particular outcomes may be triggered from the motions, where the outcomes can be responsive to a context in which the device is being used.

The details of one or more embodiments are set forth in the accompanying drawings and the description below. Other features and advantages will be apparent from the description and drawings, and from the claims.

DESCRIPTION OF DRAWINGS

FIGS. 1A-C are schematic representations of a mobile computing device in different orientations.

Like reference symbols in the various drawings indicate like elements.

DETAILED DESCRIPTION

This document describes systems and techniques for using output from an accelerometer and a magnetometer that are included in a mobile computing device to determine that a display of the mobile computing device should switch from a first mode, e.g., portrait, to a second mode, e.g., landscape. FIGS. 1A-C are schematic representations of a mobile computing device 100 in different orientations. In FIG. 1A, the user 106 is holding the mobile computing device in a landscape orientation 102, and the display on the device 100 is in a landscape mode. In FIG. 1B, the user 106 has re-oriented the mobile computing device 100 and is now holding it in a portrait orientation 104. The display on the device 100 has automatically switched into portrait mode in response to the new orientation of the device 100. In FIG. 1C, the user has laid the device down on a surface. The display on the device 100 has remained in portrait mode. Techniques and systems for using accelerometer and magnetometer input to determine whether the device 100 has re-oriented from a first orientation, e.g., landscape orientation 102, into a second orientation, e.g., portrait orientation 104, are discussed in further detail below.

Figure 2A:
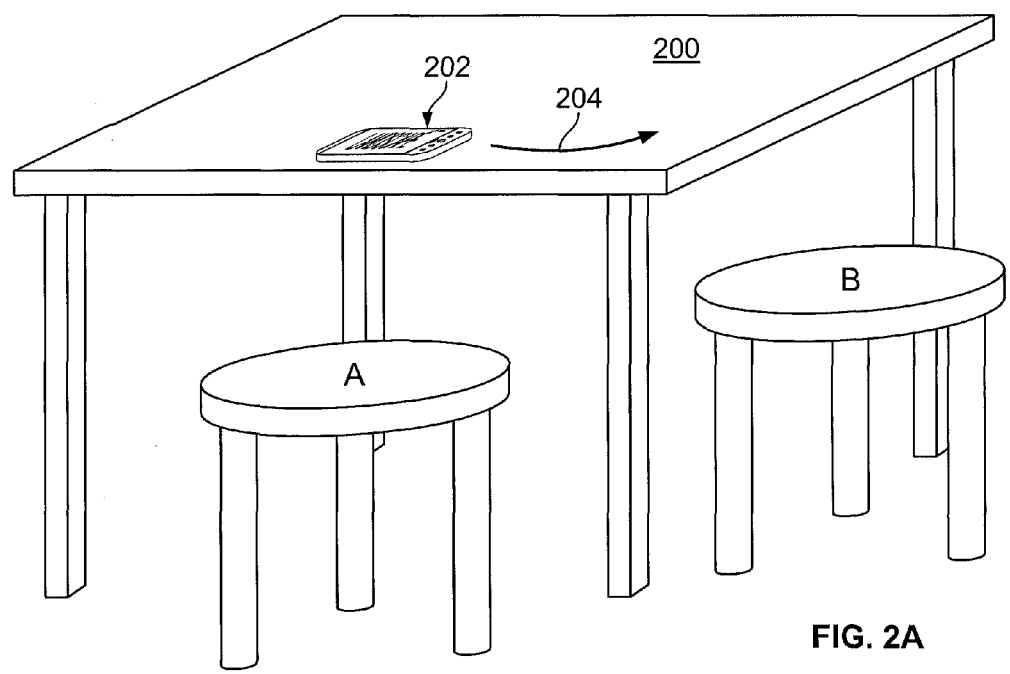
FIGS. 2A-B are schematic representations of a mobile computing device in a landscape orientation.
Figure 2B:
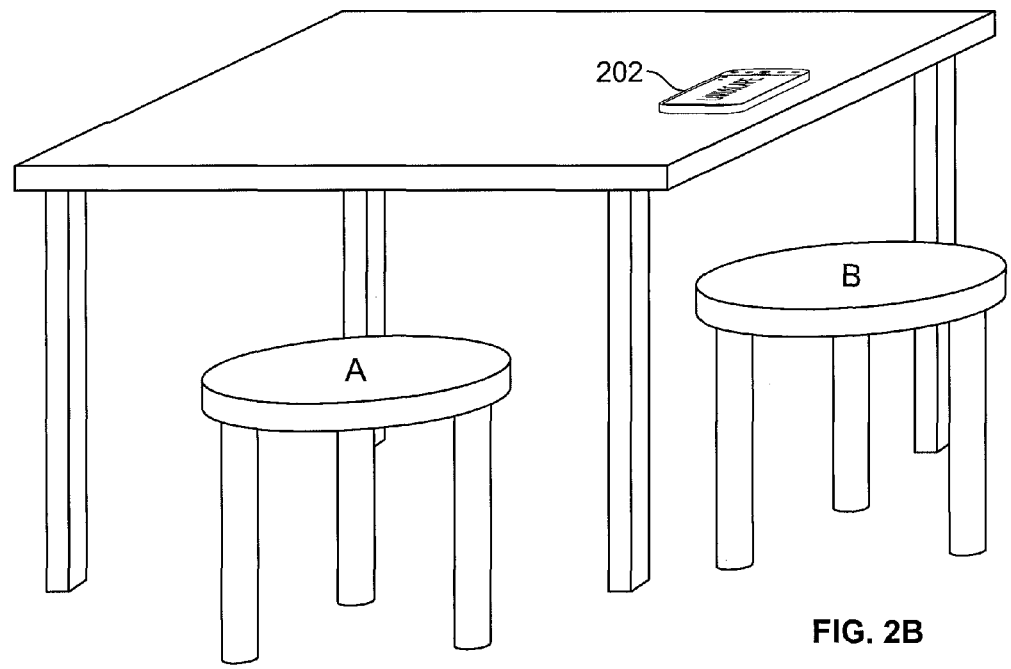

FIGS. 2A-B are schematic representations of a mobile computing device in a landscape orientation. These figures illustrate an example situation in which a mobile computing device 202 may appear to change orientation, i.e., from landscape orientation to portrait orientation; however, a change in the display mode from landscape mode to portrait mode is not desired by the user. If a user is sitting at the table 200 on stool A and looking at the display on the device 202 as the device is shown orientated, the user most likely desires a landscape mode on the display. If the user slides the device 202 across the surface of the table 200 (e.g., in the direction of the arrow 204), so that a second user sitting on stool B can look at the display, the users likely do not desire the display mode to switch to portrait mode. That is, as shown in FIG. 2B, the second user sitting at stool B would also desire the display to be in landscape mode, since relative to the second user, the device 202 is in the landscape orientation. However, relative to the user at stool A, the device has re-oriented to the portrait orientation.

Figure 3:
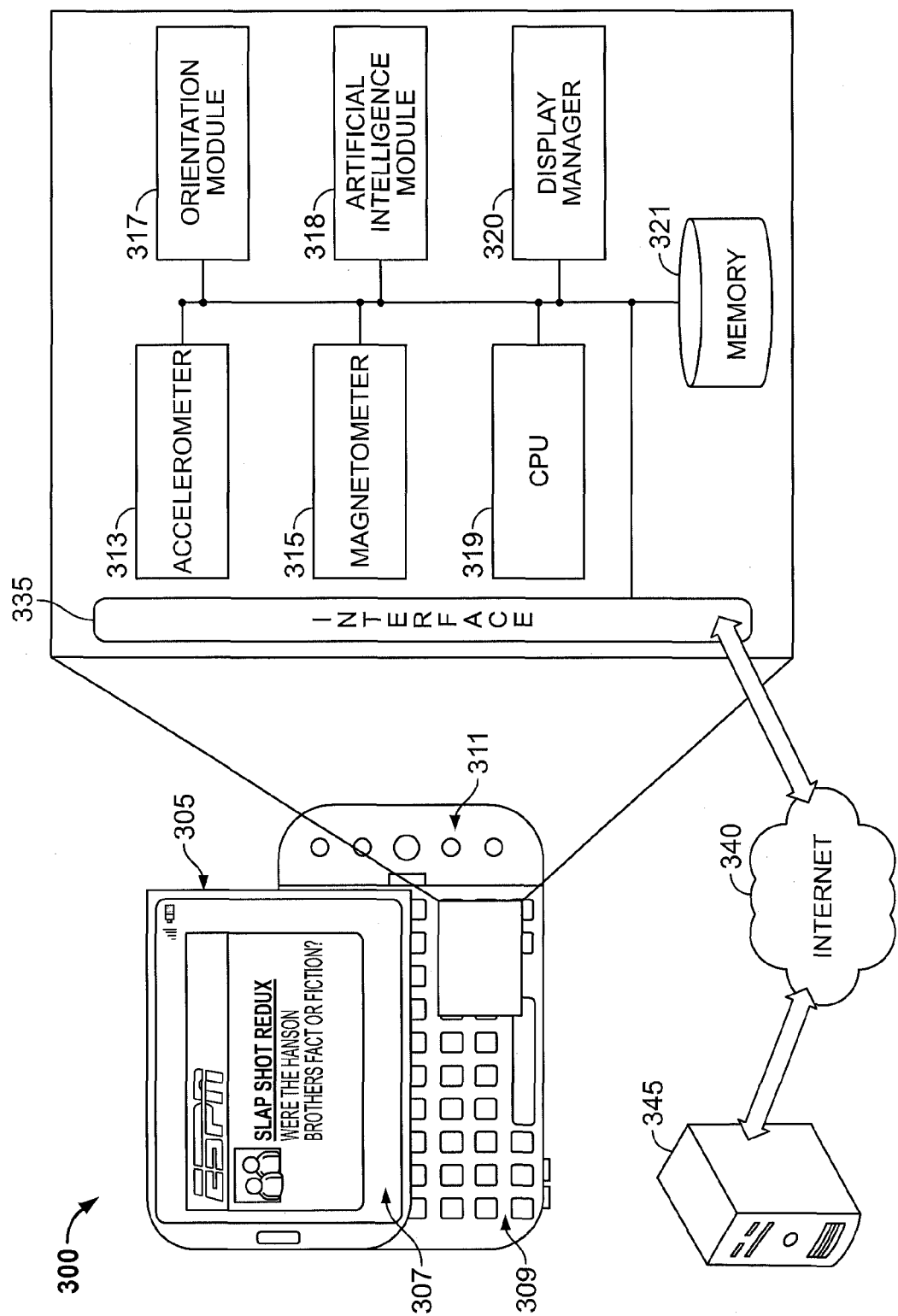
FIG. 3 is a block diagram of an example mobile computing device.

FIG. 3 is a block diagram of an example mobile computing device 300. In general, the device 300 includes components to determine an orientation of the device.

The device 300 includes a screen 307 that, in some cases, can be used to both display output to a user and accept user input. For example, the screen 307 may be a touch screen that can display a keypad that can be used to enter alphanumeric characters. The device 300 may also include a physical keypad 309 that may also be used to input information into the device. In some cases, the device 300 may include a button (not shown) on the keypad 309 or another part of the phone (e.g., on a side of the phone) that starts and stops a speech application that can execute on the device 300. Finally, the device 300 can incorporate a trackball 311 that, in some cases, may be used to, among other things, manipulate a pointing element displayed on a graphical user interface on the device 300.

The device 300 may include one or more sensors. For example, the device 300 includes an accelerometer 313 and a magnetometer (digital compass) 315. The accelerometer 313 may be used to determine an angle of the device and supply this information to other device 300 components. The device 300 includes a magnetometer 315 that can be used to determine an orientation of the device about a vertical axis.

The device 300 includes an orientation module 312 that is adapted to determine whether the display 107 should switch between portrait and landscape modes, depending on a current orientation of the device 300. The accelerometer 313 and the magnetometer 315 supply data to the orientation module 312 that can be used to make a determination about orientation of the data to be shown on display 107. A display manager 320 is included in the device 300 and can automatically re-orientate the data on the display 107 between landscape mode and portrait mode based on input received from the orientation module 312.

In some implementations, an artificial intelligence module 318 (the "AU module") can be included. The AI module 318 is configured to learn optimal orientations of the display 307 based on information from the accelerometer 313, the magnetometer 315 together with additional input data, as is described in further detail below.

The device includes a computer processor 319 that executes instructions that are stored in memory 321 and retrieved by the processor 319. The processor 319 may include multiple processors responsible for coordinating interactions among other device components and communications over an I/O interface 335. The device 300 may communicate with a remote computing system 345 through the internet 340. Some or all of the processing performed by the orientation module 321 and/or artificial intelligence module 318 can be performed by the processor 319 and/or the remote computing system 345.

Figure 4A:
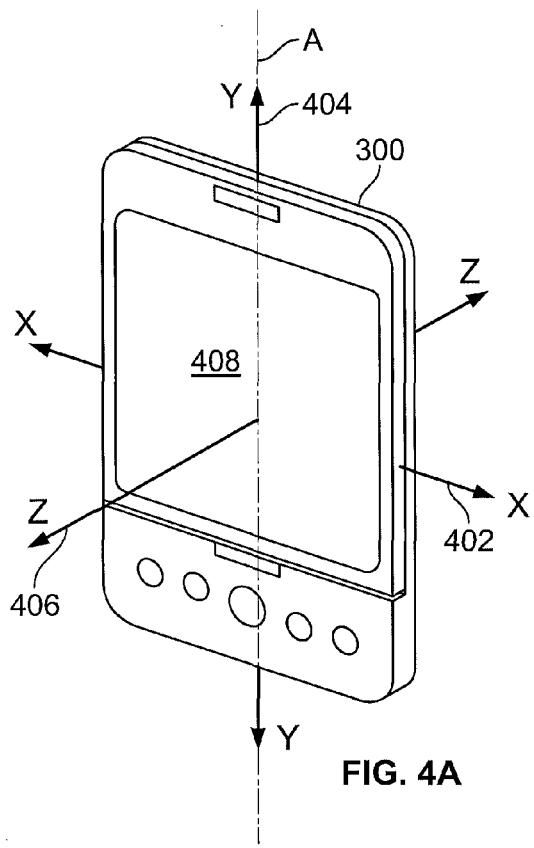
FIGS. 4A-D are perspective, side, top and front views of a mobile computing device relative to a 3-D coordinate system.
Figure 4B:
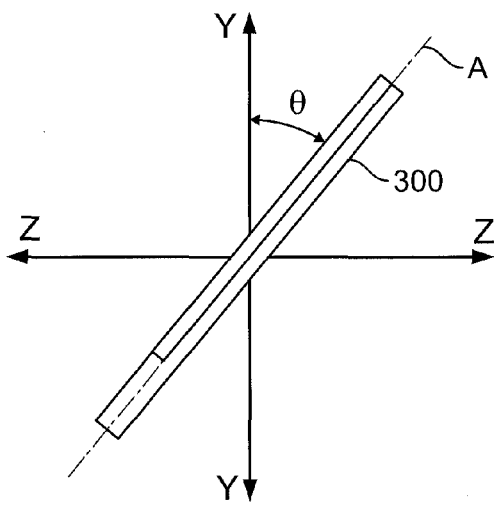
Figure 4C:
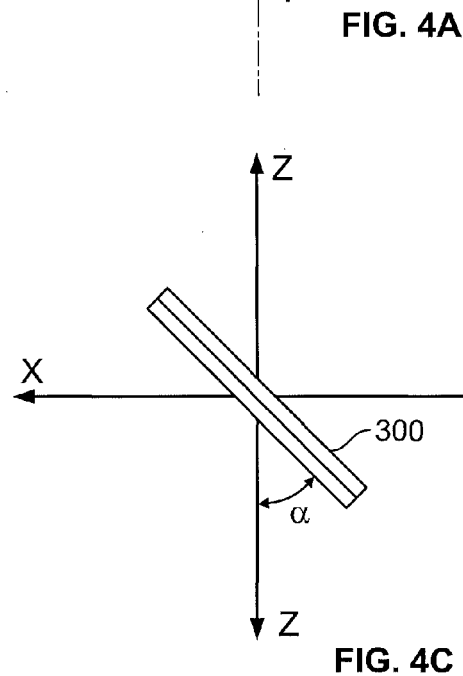
Figure 4D:
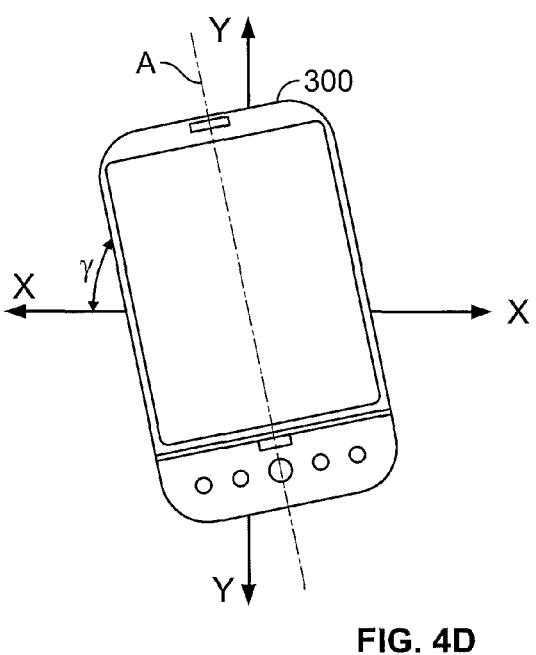

FIGS. 4A-D are perspective, side, top, and front views of a mobile computing device 400 relative to a 3-D coordinate system. Referring specifically to FIG. 4A, an example 3-D Cartesian coordinate system is shown relative to the device 400, with the X-axis 402 extending the width of the device 400, the Y-axis 404 extending the length of the device 400 and the Z-axis 406 extending at a normal into the display 408 of the device 400. FIG. 4B shows a side view of the device 400, where the device 400 is tilted at an angle of incidence $\theta$ relative to the X-Y plane. FIG. 4C shows a top view of the device 400, where the device 400 is tilted at an angle of incidence $\alpha$ relative to the Y-Z plane. FIG. 4D shows a front view of the device 400, where the device 400 is tilted at an angle of incidence $\gamma$ relative to the X-Z plane.

Referring again to FIG. 3, the accelerometer 313 is operable to provide an output that represents the acceleration of the device 300. The output can be an acceleration vector that is the product of the gravity vector and a positional acceleration vector. The gravity vector is a vector pointing downward, i.e., in the direction of the Y-axis, and is of a constant value of approximately 9.81 m/s$^2$. The positional acceleration vector changes depending on the position of the device 300, and can be represented by X, Y, and Z coordinates in the 3-D Cartesian coordinate system shown in FIG. 4A. Depending on the position of the device 300, using the accelerometer output alone does not always provide an accurate determination of the device's orientation. That is, if the device 300 is tilted in one direction or in a second direction, the accelerometer output can be identical, even though the device 300 was in two different orientations at the time of the two measurements.

The magnetometer 315 is operable to provide an output that represents the direction of a vector pointing toward magnetic north. The direction of the vector can be represented in (X, Y, Z) coordinates or in azimuth and elevation angles. The field strength is approximately constant. The magnetometer output can be used to disambiguate the accelerometer output, and thereby provide a more accurate orientation of the device 300. That is, in the above example where the accelerometer output is identical when the device 300 is in two different orientations, the magnetometer 315 output for each orientation will be different, and therefore the two orientations can be distinguished from each other using the output from the two sensors, i.e., accelerometer and magnetometer.

The magnetometer output can be used to determine the direction in which the device 300 is pointing. The gravity vector g at the determined orientation can be computed and then subtracted from the acceleration vector a. The resulting vector is the positional acceleration vector p. The positional acceleration vector p can therefore be determined apart from the combined acceleration vector a, i.e., the output from the accelerometer, and can be used to determine an orientation of the device 300, e.g., the angle of incidence of the device 300 relative to one or more planes. That is, the position of the device 300 can be determined based on the last-known position of the device 300, the time that has passed since the device 300 was in the last-known position and the positional acceleration vector p, which represents the positional acceleration of the device 300 since the last accelerometer output.

The orientation module 317 is configured to receive a first input from the accelerometer 313 and a second input from the magnetometer 315 and to determine the orientation of the device 300 based on a combination of the first and second inputs. The display manager 320 is configured to rotate the orientation of the content displayed on the display 307 based on the determined orientation of the device 300.

In some implementations, the orientation module 317 is further configured to determine a first weighting of the first input received from the accelerometer 313 and a second weighting of the second input received from the magnetometer 315. The orientation is determined based the weighted first and second inputs.

In some implementations, the first and second weightings can be determined based on the angle of incidence of an axis of the device 300 compared to a plane. For example, referring to FIG. 4B, the axis of the device 300 can be the axis A extending the length of the device 300 (i.e., parallel to the Y-Axis 404) and the angle of incidence can be $\theta$, the angle of the device 300 relative to the X-Y plane. When the angle of incidence $\theta$ is 90°, the axis A is in a substantially horizontal orientation (i.e., parallel to the Z-axis 406), and therefore the device 300 is in a horizontal orientation, e.g., resting on a table top. In a horizontal orientation, the second input received from the magnetometer 315 can be given a higher weighting than the first input received from the accelerometer 313. That is, generally, the accelerometer input is less useful when the device is laying flat than when the device is orientated in a more vertical direction.

In one example, the second weighting, i.e., the weighting of the magnetometer input, is 100% when the angle of incidence $\theta$ is approximately 90° and the first weighting of the accelerometer input is 0%. That is, only the magnetometer input is used to determine the orientation of the device 300 when the device is substantially horizontal. Conversely, when the angle of incidence $\theta$ is approximately 0°, i.e., the device 300 is substantially vertical (e.g., as shown in FIG. 4A), the first weighting of the accelerometer input is 100% and the second weighting of the magnetometer is 0%. That is, only the accelerometer input is used to determine the orientation of the device 300 when the device is orientated substantially vertically. As the angle of incidence $\theta$ increases from 0° to 90°, that is, as the device 300 re-orientates from vertical toward horizontal, the second weighting of the magnetometer input increases and the first weighting of the accelerometer input decreases. That is, in a vertical orientation, the first weighting is 100% and the second weighting is 0%, but as the angle of incidence $\theta$ increases the first weighting reduces from 100% and the second weighting increases from 0%, until the device 300 is in the horizontal orientation and the first weighting has reduced to 0% and the second weighting has increased to 100%.

The above example determines the weightings based on an angle of incidence $\theta$ with respect to the X-Y plane. In other examples, the weightings can be based on the angle of incidence $\alpha$ with respect to the Y-Z plane as shown in FIG. 4C and/or the angle of incidence $\gamma$ with respect to the X-Z plane as shown in FIG. 4D.

In some implementations, multiple angles of incidence, e.g., angles $\theta$, $\alpha$ and $\gamma$, relative to multiple planes, e.g., X-Y, Y-Z and X-Z planes, can be determined, and the first and second weightings for the accelerometer and magnetometer inputs respectively can be determined based on the multiple angles of incidence. In some implementations, the weightings to assign to the accelerometer and magnetometer inputs at the multiple angles of incidence $\theta$, $\alpha$ and $\gamma$ can be determined empirically, e.g., by experimentation, and stored for later retrieval and use. That is, experiments can be conducted to determine the relative accuracy of the inputs from the accelerometer and magnetometer for different values of $\theta$, $\alpha$ and $\gamma$, and based on the relative accuracies, the weightings can be assigned. In some implementations, a weightings table can be established that includes the weights at various values of $\theta$, $\alpha$ and $\gamma$. Then later, when the angles of incidence are determined for a particular orientation of the device, the weightings are obtained from the weightings table.

In some implementations, the orientation module 317 can apply rules based logic to the first and second weightings to determine whether to use the orientation indicated by the accelerometer input or the orientation indicated by the magnetometer input, if they are indicating different orientations. That is, if the accelerometer input indicates that the device 300 is in the landscape orientation and the magnetometer input indicates that the device 300 is in the portrait orientation, then the rule applied can be that the input from the sensor with the highest weightings is used to determine the orientation. For example, if the device is orientated at an angle of incidence $\theta$ of 70°, that is, the device 300 is tilted 20° from horizontal, then the magnetometer input would be weighted more heavily than the accelerometer input. In this example, the orientation indicated by the magnetometer input, i.e., portrait orientation, would be selected by the orientation module 317 as the orientation of the device 300.

At some orientations, the first and second weightings can be the same. For example, if the angle of incidence $\theta$ is 45°, that is, the device is tilted halfway between horizontal and vertical, the first and second weightings can be both 50%. If the weightings are equal, but the accelerometer input indicates that the orientation is landscape and the magnetometer input indicates that the orientation is portrait, then a third data point can be used to determine the orientation. In some implementations the third data point is the last determined orientation of the device. That is, the default is to assume the status quo, so that if the last determined orientation was landscape, then the orientation is assumed to remain landscape.

In some implementations, the accelerometer input and the magnetometer input can both be used to determine coordinates that represent the orientation of the display of the device 300. In one example, the coordinates are x, y and z coordinates of a vector in the coordinate system shown in FIG. 4A. In another example, the coordinates can be polar coordinates describing the azimuth and elevation angles of the device 300. Other coordinate systems can be used. The first and second weightings can be applied to the two inputs to determine based on the weighted inputs the coordinates, from which the orientation can be determined. For example, if the first and second weightings are the same (e.g., 50% and 50%), then the two inputs can be averaged to determine the current orientation of the device 300. If the device 300 is tilted more toward horizontal, the magnetometer input dominates, i.e., is more heavily weighted, although the accelerometer input is still used in the determination.

The more frequently the orientation of the device 300 is determined, the shorter the time to respond to a change in the orientation of the device 300. For example, referring again to FIGS. 1A and 1B, if the user is holding the device in the landscape orientation (FIG. 1A) and then rotates the device into the portrait orientation (FIG. 1B), if the display orientation changes nearly simultaneously, i.e., in a short response time, the user 106 is generally satisfied. The longer the response time, the less the user 106 is satisfied with the automatic orientation feature of the device 300. However, the shorter the response time can come at the cost of increased power usage for the device 300 (which can therefore mean a quicker draining of the battery). For example, determining the orientation every second can provide a relatively short response time, but can use an un-satisfactory amount of power. Accordingly, a balance can be found between a satisfactory response time and power usage. For example, the orientation can be determined every 2 to 3 seconds. In implementations desiring less power usage, the orientation can be determined every 5 to 10 seconds.

To determine whether the orientation at time $t_1$ is a landscape or a portrait orientation can include comparing the inputs to the orientation module 317 at $t_1$ from the accelerometer and magnetometer to the previous input, e.g., the input at time $t_0$. By way of illustrative example, consider a simple situation where the device 300 is substantially vertical as shown in FIG. 4D. If the angle of incidence $\gamma$ changes from $t_0$ to $t_1$ by approximately 90 degrees, then the device has been rotated a ¼ turn in the clockwise or counter-clockwise direction and has most likely changed orientations. That is, if at $t_0$ the device 300 was in portrait mode then at $t_1$ the device 300 is in landscape mode and visa versa. The actual position of the device 300 does not necessarily have to be used to determine the orientation, but rather the relative change in the position from the last received input can be used to make the determination. Referring again to the same example, if the angle of incidence $\gamma$ changed by only 15 degrees between $t_0$ and $t_1$, then the orientation module 317 can determine that there has been no change in orientation, and accordingly there will be no change in the display mode.

In other implementations, to determine whether the orientation at time $t_1$ is a landscape or a portrait orientation can include comparing the input to a frame of reference. The relative difference between the input at $t_1$ and the frame of reference can indicate the orientation of the device.

Figure 5:
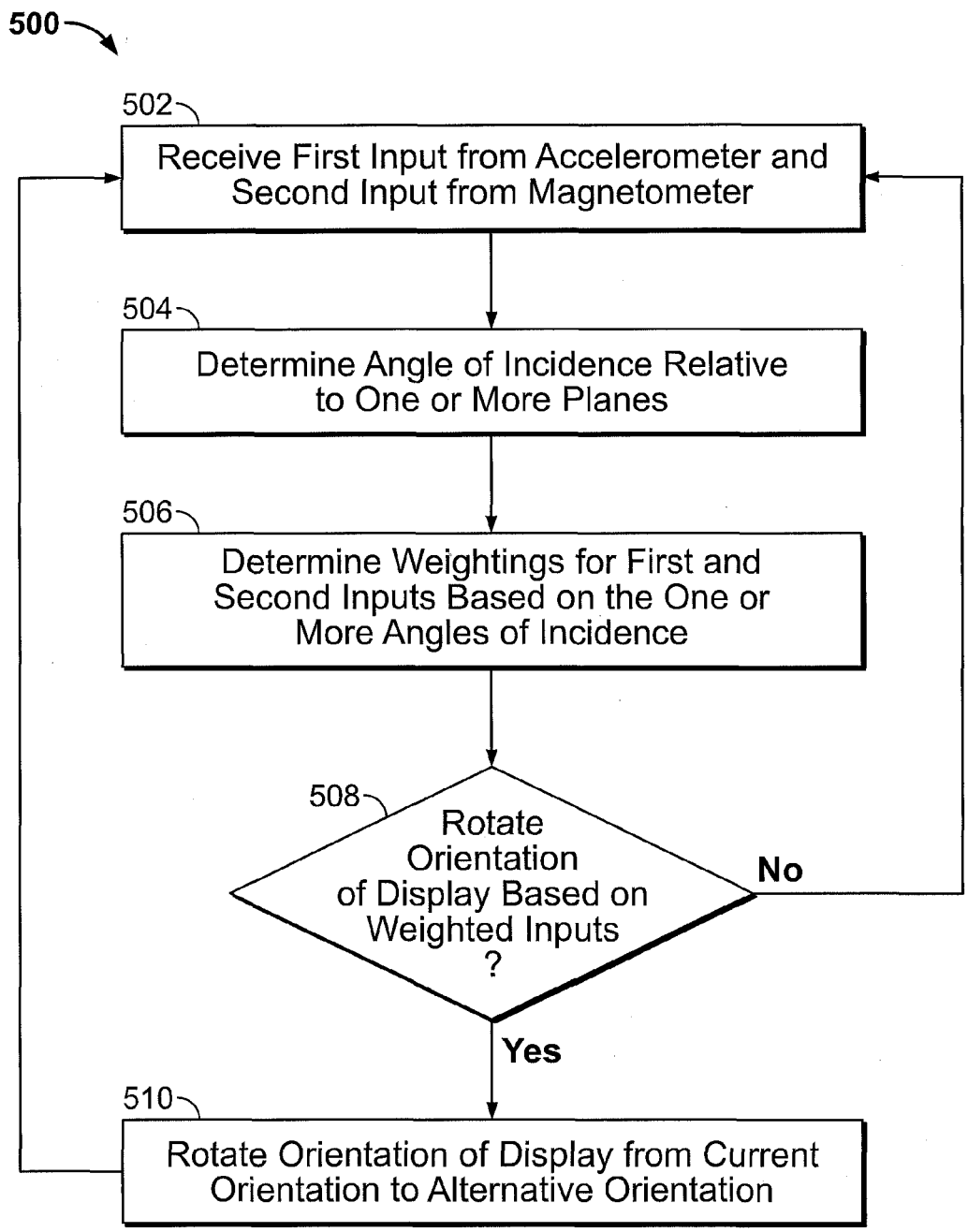
FIG. 5 is a flowchart of an example process for determining whether or not to change the display orientation of a mobile computing device.

Referring to FIG. 5, a flowchart is shown for an example process 500 for determining whether or not to change the display orientation of a mobile computing device. For illustrative purposes, the process 500 is described in reference to the device 300 shown in FIG. 3, however, it should be understood that a differently configured device can be used to perform the process 500. A first input is received from the accelerometer 313 and a second input is received from the magnetometer 315 (Box 502). An angle of incidence of the device 300 relative to one or more planes is determined (Box 504). For example, in some implementations, the angle of incidence $\theta$ relative to the X-Y plane is determined (see FIG. 4B). In other examples, the angles of incidence $\alpha$ and/or $\gamma$ are determined (see FIGS. 4C and 4D). The angle of incidence of the device 300 relative to the one or more planes can be determined based on the first and second inputs received from the accelerometer and magnetometer respectively. Based on the one or more angles of incidence determined, a first weighting and a second weighting are determined for the first and second inputs respectively (Box 506). For example, as was described above, the first and second weightings can be obtained from a weightings table that includes weightings for multiple different values of the one or more angles of incidence. The weightings can be weightings that were previously determined empirically and that reflect the relative accuracies of the inputs received from the two sensors, i.e., the accelerometer and the magnetometer, at different orientations of the device. In some orientations, the magnetometer input may be found to be more reliable than the accelerometer input and visa versa. The weightings can reflect these findings.

Based on the weighted first and second inputs, a determination can be made whether or not to rotate the orientation of the display (Decision 508). If the orientation module 317 determines that the orientation of the device has changed in a manner that indicates the display has rotated by approximately 90° ("Yes" branch of 508), then an input can be provided to the display manager 320 to rotate the orientation of the display to switch from the current orientation to the alternative orientation (e.g., from landscape mode to portrait mode or visa versa) (Box 510). The process then loops back to 502. If the orientation module 317 determines that the orientation of the device has not changed in a manner that indicates the display has rotated by approximately 90° ("No" branch of 508), then the process loops back to Box 502. It should be understood that if the user rotates the device approximately 270°, i.e., a ¾ turn, the end point is still approximately 90° from the previous position, and would therefore still result in a "Yes" determination at decision 508.

Once back at Box 502 the process repeats. For example, as described above, the process can repeat every 2 to 3 seconds, or longer or shorter depending on the desired response time and power usage.

The mobile computing device 300 described above has two display modes; landscape and portrait. However, in some implementations, a device can have more than two display modes. For example, consider a device with a circular display. As the device is rotated in a clockwise or counterclockwise position, the display mode can keep the display in a constant position relative to a user. That is, the housing of the device could be rotating, but the content displayed could remain in the same position (although it would be changing position relative to the housing). The same systems and techniques described above for determining whether to switch between landscape mode and portrait mode can be used for such a device. That is, rather than switching between a first mode and a second mode based on the detection of the display rotating by approximately 90°, the mode can switch from a first mode to a second mode that is X degrees different from the first mode based on the detection of the display rotating by approximately X degrees. Other implementations are possible, and these described are illustrative and non-limiting.

In some implementations, the optional artificial intelligence (AI) module 318 shown in FIG. 3 can be operable to learn optimal rotation pattern based on behavior of the user of the device 300. As mentioned above, the AI module 318 can be implemented in whole or in part on the device 300 or in whole or in part on a remote computing system, e.g., system 345. Referring again to FIGS. 2A and 2B, as discussed above, if the device 202 was slid across the table 200 from a user sitting on stool A so that a second user sitting on stool B could look at the content displayed on the device 202, the second user most likely would prefer that the display mode not change. However, because the device 202 has rotated by approximately 90°, and is now in portrait orientation relative to the user at stool A, the display mode may automatically change to portrait mode in error. When the display mode changes in error, there is typically a swift user response that is intended by the user as a "corrective action", i.e., to get the device to display in the correct mode.

Predictive analytics generally refers to techniques for extracting information from data to build a model that can predict an output from a given input. Predicting an output can include predicting future trends or behavior patterns, or performing sentiment analysis, to name a few examples. The AI module 318 can employ predictive analytics to predict whether a particular set of input from the accelerometer 313 and the magnetometer 315 indicates that the display mode should switch from a current mode to the alternative mode or not.

Various types of predictive models can be used to analyze data and generate predictive outputs. The number of different types of predictive models available is extensive. Some examples of types of predictive models include (without limitation) regression models (e.g., linear regression, logistic regression), classification and regression tree models, multivariate adaptive regression spline models and other machine learning models (e.g., Naïve Bayes, k-nearest neighbors, Support Vector Machines, Perceptron).

Typically, a predictive model is trained with training data that includes input data and output data that mirror the form of input data that will be entered into the predictive model and the desired predictive output, respectively. In some implementations, the training data includes the first input from the accelerometer and the second input from the magnetometer that were received immediately prior to a corrective action occurring. The corrective action itself is not included in the training data, because the input data to the trained model will be in the form of accelerometer and magnetometer inputs. Once the model is trained, the expectation is that input data in the form of accelerometer and magnetometer inputs can be received by the AI module 318 and an erroneous rotation of the display mode can be avoided, and therefore a corrective action does not occur.

In order to determine what to use as training data, the AI module 318 detects a number of corrective actions, such that the accelerometer and magnetometer inputs received immediately prior to the corrective action can be identified as training data. The AI module 318 can detect that a user action is a corrective action based on a number of different factors, including for example, the timing from the switch of the display mode to the receipt of the action. The shorter the time between the two events, the more likely the action is a corrective action. Another factor that can be used to determine whether an action is corrective is the urgency of the action. For example, output from the accelerometer 313 can be used to determine that the device 300 is being shaken. When the user is shaking the device 300, this can be an indication that the user was not satisfied with an action or inaction of the device. That is, the user either was dissatisfied with the display mode switching, or was expecting the mode to switch, but it did not. When using a "shaking input" as a corrective action for training data purposes, the level of urgency of the shaking can be used to weight the associated input data (i.e., accelerometer and magnetometer inputs) more heavily. Another factor that can be used to determine whether an action is a corrective action is the change in angle of incidence $\theta$ caused by the action (see FIG. 4B). For example, if the action results in a change in the angle of incidence $\theta$ of approximately 90°, which may indicate that the user has abruptly changed the position of the device 300, this may suggest a corrective action, compared to a lesser change in the angle of incidence $\theta$ of approximately 10°. In some implementations, two or more of the factors discussed above can be used to characterize an action as a corrective action or a potential corrective action for the purpose of identifying training data.

In some implementations, the output data provided to the model as training data can be either "override orientation module and do not switch display mode" or "switch display mode". That is, where a corrective action occurs immediately after a change in display mode, then the user undertook the corrective action in an attempt to get the display mode to change back, i.e., a rotation in the display was not desired. If the same accelerometer and magnetometer inputs are received again by the orientation module 317, then the display mode again will be switched, and a corrective action may be received again. Assuming that the user's action has been correctly identified as a corrective action, the presumption is that the orientation module was wrong in signaling the display manager 320 to switch the display mode, and therefore signal from the orientation module should be overridden and the display manager should not switch the display mode.

Where a corrective action occurs that is not temporally associated with a switch in display mode (i.e., it occurs too long after the last switch), then the presumption is that the orientation module ought to have signaled the display manager 320 to switch the display mode but failed to identify the change in orientation of the device 300. In this scenario, the output data used for the training data can be to "override orientation module and switch display mode", that is, instruct the display manager 320 do a switch in the absence of instructions from the orientation module 318.

The identified training data can be used to train an analytical model. Once the trained model is available, e.g., via the AI module 318, input data can be provided to the trained model at a desired frequency. For example, if the orientation is being monitored every 2-3 seconds, input data can be provided to the AI module 318 every 2-3 seconds. When input data is received that the AI module 318 recognizes as requiring an override of the orientation module, either to force a display mode switch or ignore a display mode switch signal, the output data is either "override orientation module and switch display mode" or "switch display mode". Otherwise, the output data from the AI module 318 can be a default output of "do not override orientation module".

In some implementations, training data can be provided continuously or periodically to continue to train the model (or to train a new model), so as to continually or periodically improve the effectiveness of the AI module 318 in optimizing the rotation of the display.

The display manager 320 can receive input from both the orientation module 317 and the AI module 318. The display manager 320 can be operable to change the display mode based on the input received from the orientation module 317 as long as there is no contradicting input received from the AI module, i.e. the AI module 318 is silent or the input received from the AI module 318 is "do not override orientation module". The display manager 320 can be further operable to change the display mode based on the input received from the AI module 318 in all other instances, i.e., when the input from the AI module 318 indicates to override the orientation module 317 and do not switch the display mode or the input from the AI module 318 indicates to switch the display mode.

Figure 6:
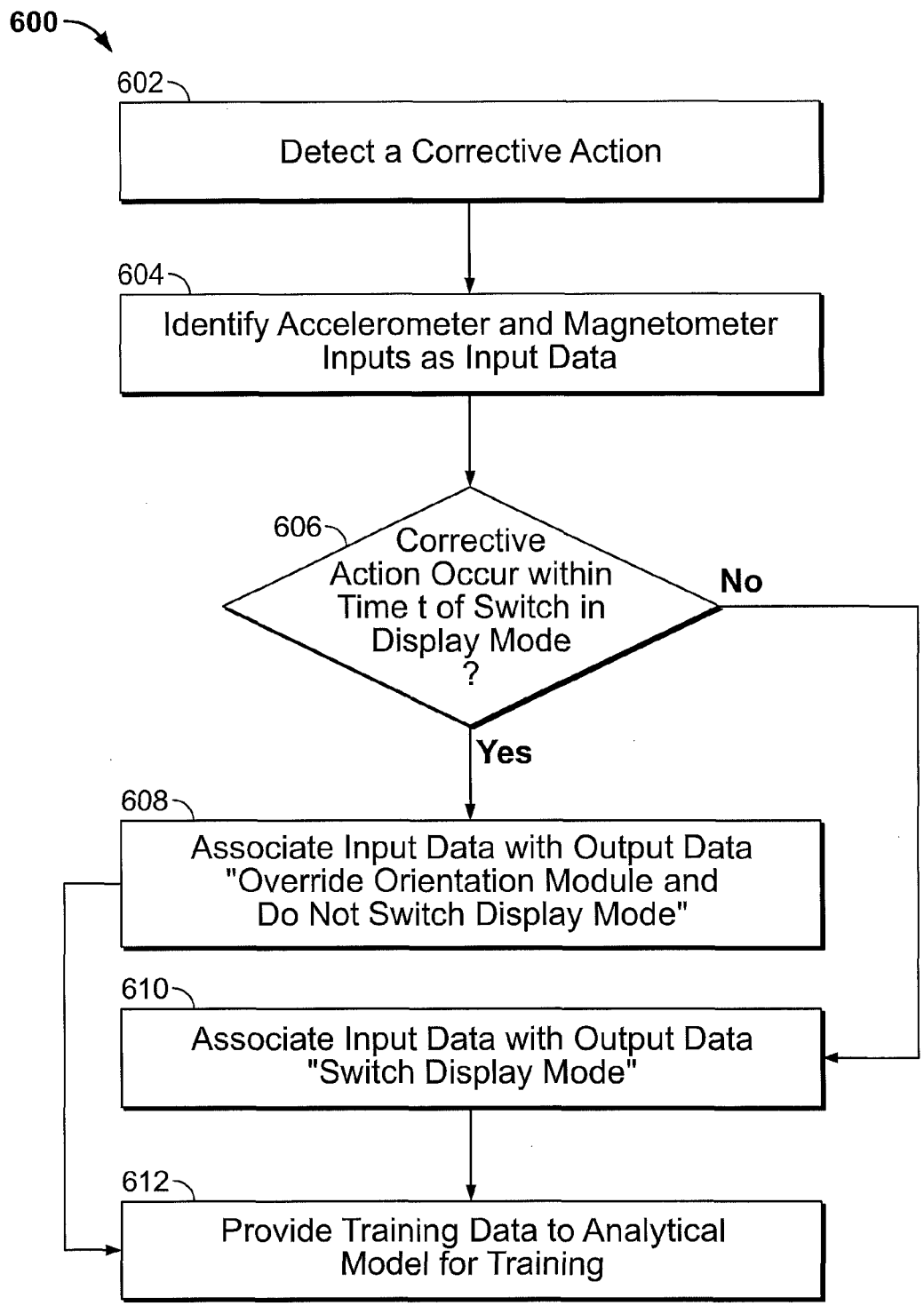
FIG. 6 is a flowchart showing an example process for identifying training data to provide to an analytical model.

FIG. 6 is a flowchart showing an example process 600 for identifying training data to provide to an analytical model. For illustrative purposes, the process 600 is described in reference to the device 300 shown in FIG. 3, however, it should be understood that a differently configured device can be used to perform the process 600. A corrective action is detected (Box 602). Some example factors that can be used to detect a corrective action were discussed above, e.g., the timing between the action and a switch in display mode and/or the nature of the action (e.g., urgent shaking or a sudden change in angle of incidence). The first input received from the accelerometer 313 and the second input received from the magnetometer 315 immediately prior to the corrective action, or if a display mode switch had just occurred, then the first and second inputs that provided the display mode switch, are identified as input data to be included in the training data (Box 604).

If the corrective action occurred within a predetermined time t of a switch in display mode (e.g., within 1 second) ("Yes" branch of determination 606), then the identified input data can be associated with output data "override orientation module and do not switch display mode" (Box 608). That is, the corrective action indicates that the switch in display mode was in error, and therefore the orientation module provided an erroneous signal to the display manager 320, and the display manager 320 should therefore override the orientation module 317 and not switch the display mode.

If the corrective action did not occur within a predetermined time t of a switch in display mode ("No" branch of determination 606), then the identified input data can be associate with output data "switch display mode" (Box 610). That is the corrective action was not provided by an erroneous switch in display mode, and was therefore provoked by a failure to switch the display mode. The orientation module 317 therefore failed to provide a signal to the display manager 320 to switch the display mode. The display manager should therefore be instructed by the AI module 318 to switch the display mode.

The input data and the associated output data, i.e., the training data, is provided to an analytical model for training (Box 612). The process 600 can be repeated for a predetermined period of time, i.e., for a "training period". In other implementations, the process 600 can be initially repeated for the training period but later repeated either continually or periodically to either continually or periodically provide additional training data to the analytical model. Training the analytical model can occur on the mobile computing device 300, although the training can occur remote to the mobile computing device 300, e.g., at remote computing system 345. The trained model can be either included in the mobile computing device 300, or can be stored and executed on a remote computing system, e.g., the remote computing system 345. That is, input data can be provided from the mobile computing device to the remote computing system 345 that is executing the trained model to generate output data. The output data can be received from the remote computing system 345 and provided to the display manager 320.

Figure 7:
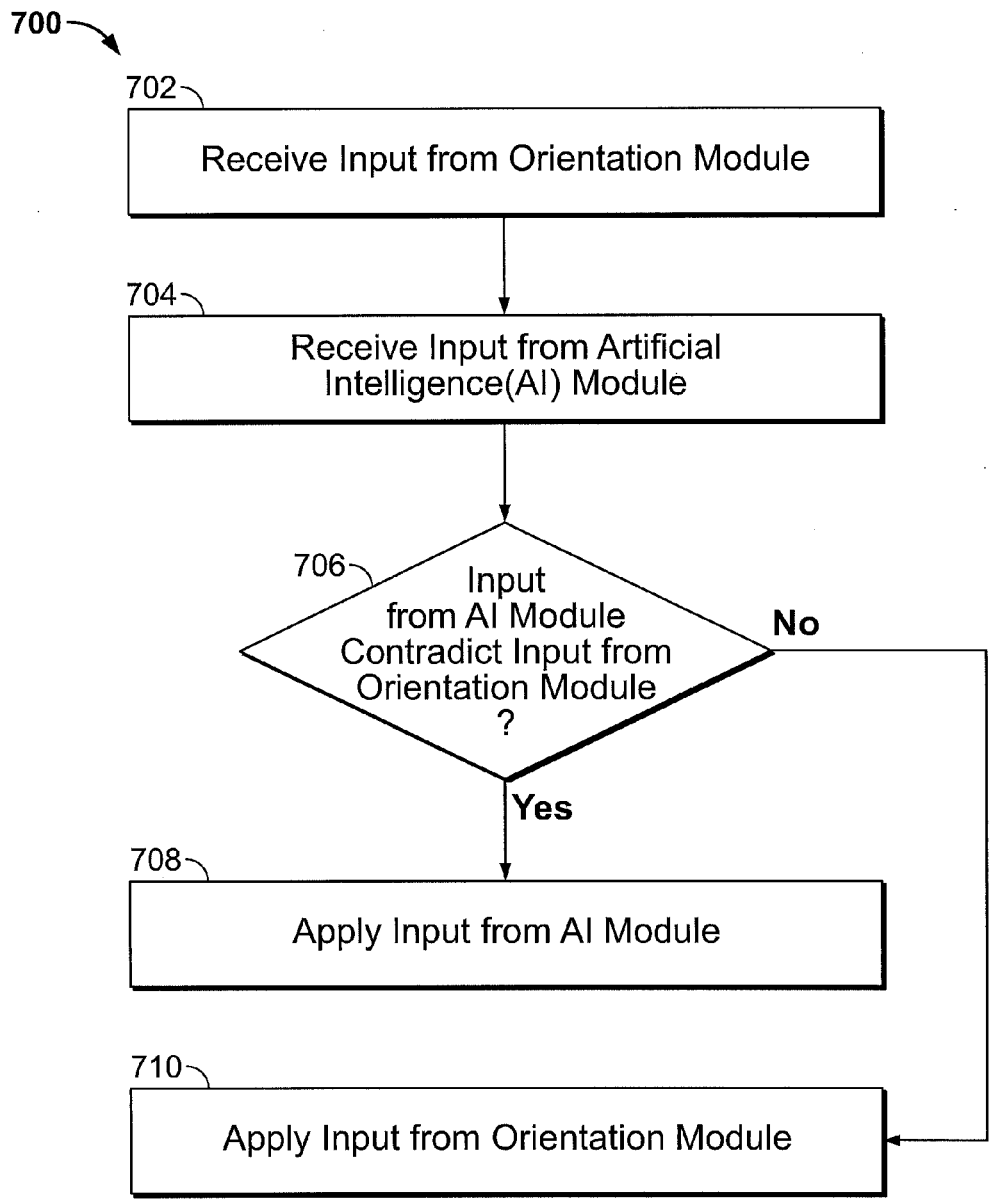
FIG. 7 is a flowchart showing an example process for switching the display mode of a mobile computing device.

FIG. 7 is a flowchart showing an example process 700 for switching the display mode of a mobile computing device. For illustrative purposes, the process 700 is described in reference to the device 300 shown in FIG. 3, however, it should be understood that a differently configured device can be used to perform the process 700. Input is received from the orientation module 317 by the display manager 320, e.g., to switch the display mode from a current mode to an alternative mode (Box 702). Input is received from the AI module 318 by the display manager (Box 704). If the input from the AI module 318 contradicts the input from the orientation module ("Yes" branch of determination 706), then the input from the AI module is applied (Box 708). If the input from the AI module 318 does not contradict the input from the orientation module ("No" branch of determination 706), then the input from the orientation module is applied (Box 710). The process 700 can continue to repeat with the frequency of the inputs being received from the orientation module and the AI module.

Detecting a corrective action when the display mode is in the incorrect orientation is described above. In other implementations, a corrective action can be detected that relates to other instances of user dissatisfaction with the current mode of their mobile computing device. For example, the user may be dissatisfied with the latency of the device in performing a particular function. By way of illustration, the user may be attempting to load a web page into a browser, while at the same time, in the background, the user's e-mail account and calendar are updating and syncing by communicating with a remote server. The user may become dissatisfied with the slow speed at which the web page is loading and shake the device. In response to the user action of shaking the device, the updating and syncing of the e-mail and calendar can page and more resources can be directed to loading the webpage, thereby reducing the latency. In some implementations, training data can be provided to train an analytical model (that is accessible by the AI module 318) to recognize user actions that indicate dissatisfaction with the latency of the mobile computing device. The training data includes input data and output data. In this example, the input data can be one or more sensor outputs, e.g., accelerometer output, that indicates shaking of the device. The output data can be a responsive action to temporarily pause one or more operations (e.g., updating e-mail) and to direct more resources to an operation currently being accessed by the user (e.g., loading a particular webpage). The AI module 318 can then provide input data to the trained model and receive corrective output instructions when a user action indicating dissatisfaction with latency is recognized. A user action of shaking the device is one example, however, it should be understood that other types of user actions can be learned by the AI module 318 to indicate dissatisfaction with responsiveness, e.g., an abrupt chance in the angle of incidence.

In other implementations, the AI module 318 can be pre-programmed with particular input data and associated actions to take in response to identifying such input data. In these implementations, the input data is not learned from a particular user (or users) of the device, but correspond to typical input data expected from users generally when dissatisfied with device latency. For example, accelerometer output that typically indicates shaking of the device can be an input data that is associated with an action to pause all background operations until a current foreground operation completes.

Figure 8:
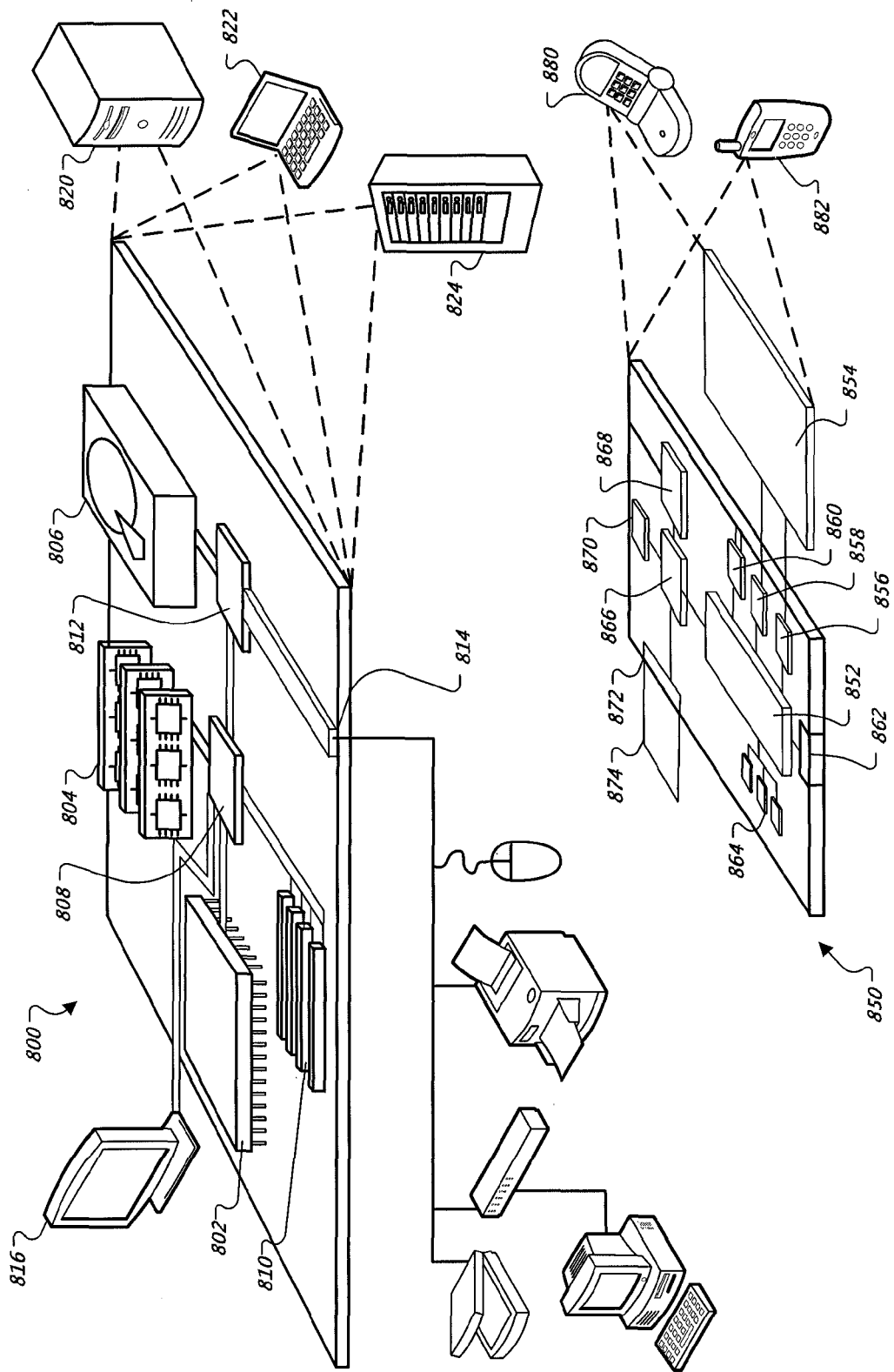
FIG. 8 shows examples of computer devices that may be used to execute the actions discussed in this document.

FIG. 8 shows an example of a computer device 800 and a mobile computer device 850, which may be used with the techniques described here. Computing device 800 is intended to represent various forms of digital computers, such as laptops, desktops, workstations, personal digital assistants, servers, blade servers, mainframes, and other appropriate computers. Computing device 850 is intended to represent various forms of mobile devices, such as personal digital assistants, cellular telephones, smartphones, and other similar computing devices. The components shown here, their connections and relationships, and their functions, are meant to be exemplary only, and are not meant to limit implementations of the inventions described and/or claimed in this document.

Computing device 800 includes a processor 802, memory 804, a storage device 806, a high-speed interface 808 connecting to memory 804 and high-speed expansion ports 810, and a low speed interface 812 connecting to low speed bus 814 and storage device 806. Each of the components 802, 804, 806, 808, 810, and 812, are interconnected using various busses, and may be mounted on a common motherboard or in other manners as appropriate. The processor 802 may process instructions for execution within the computing device 800, including instructions stored in the memory 804 or on the storage device 806 to display graphical information for a GUI on an external input/output device, such as display 816 coupled to high speed interface 808. In other implementations, multiple processors and/or multiple buses may be used, as appropriate, along with multiple memories and types of memory. Also, multiple computing devices 800 may be connected, with each device providing portions of the necessary operations (e.g., as a server bank, a group of blade servers, or a multi-processor system).

The memory 804 stores information within the computing device 800. In one implementation, the memory 804 is a volatile memory unit or units. In another implementation, the memory 804 is a non-volatile memory unit or units. The memory 804 may also be another form of computer-readable medium, such as a magnetic or optical disk.

The storage device 806 is capable of providing mass storage for the computing device 800. In one implementation, the storage device 806 may be or contain a computer-readable medium, such as a floppy disk device, a hard disk device, an optical disk device, or a tape device, a flash memory or other similar solid state memory device, or an array of devices, including devices in a storage area network or other configurations. A computer program product may be tangibly embodied in an information carrier. The computer program product may also contain instructions that, when executed, perform one or more methods, such as those described above. The information carrier is a computer- or machine-readable medium, such as the memory 804, the storage device 806, memory on processor 802, or a propagated signal.

The high speed controller 808 manages bandwidth-intensive operations for the computing device 800, while the low speed controller 812 manages lower bandwidth-intensive operations. Such allocation of functions is exemplary only. In one implementation, the high-speed controller 808 is coupled to memory 804, display 816 (e.g., through a graphics processor or accelerator), and to high-speed expansion ports 810, which may accept various expansion cards (not shown). In the implementation, low-speed controller 812 is coupled to storage device 806 and low-speed expansion port 814. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 800 may be implemented in a number of different forms, as shown in the figure. For example, it may be implemented as a standard server 820, or multiple times in a group of such servers. It may also be implemented as part of a rack server system 824. In addition, it may be implemented in a personal computer such as a laptop computer 822. Alternatively, components from computing device 800 may be combined with other components in a mobile device (not shown), such as device 850. Each of such devices may contain one or more of computing device 800, 850, and an entire system may be made up of multiple computing devices 800, 850 communicating with each other.

Computing device 850 includes a processor 852, memory 864, an input/output device such as a display 854, a communication interface 866, and a transceiver 868, among other components. The device 850 may also be provided with a storage device, such as a microdrive or other device, to provide additional storage. Each of the components 850, 852, 864, 854, 866, and 868, are interconnected using various buses, and several of the components may be mounted on a common motherboard or in other manners as appropriate.

The processor 852 may execute instructions within the computing device 850, including instructions stored in the memory 864. The processor may be implemented as a chipset of chips that include separate and multiple analog and digital processors. The processor may provide, for example, for coordination of the other components of the device 850, such as control of user interfaces, applications run by device 850, and wireless communication by device 850.

Processor 852 may communicate with a user through control interface 858 and display interface 856 coupled to a display 854. The display 854 may be, for example, a TFT LCD (Thin-Film-Transistor Liquid Crystal Display) or an OLED (Organic Light Emitting Diode) display, or other appropriate display technology. The display interface 856 may comprise appropriate circuitry for driving the display 854 to present graphical and other information to a user. The control interface 858 may receive commands from a user and convert them for submission to the processor 852. In addition, an external interface 862 may be provide in communication with processor 852, so as to enable near area communication of device 850 with other devices. External interface 862 may provide, for example, for wired communication in some implementations, or for wireless communication in other implementations, and multiple interfaces may also be used.

The memory 864 stores information within the computing device 850. The memory 864 may be implemented as one or more of a computer-readable medium or media, a volatile memory unit or units, or a non-volatile memory unit or units. Expansion memory 874 may also be provided and connected to device 850 through expansion interface 872, which may include, for instance, a SIMM (Single In Line Memory Module) card interface. Such expansion memory 874 may provide extra storage space for device 850, or may also store applications or other information for device 850. Specifically, expansion memory 874 may include instructions to carry out or supplement the processes described above, and may include secure information also. Thus, for example, expansion memory 874 may be provide as a security module for device 850, and may be programmed with instructions that permit secure use of device 850. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 864, expansion memory 874, memory on processor 852, or a propagated signal that may be received, for example, over transceiver 868 or external interface 862.

Device 850 may communicate wirelessly through communication interface 866, which may include digital signal processing circuitry where necessary. Communication interface 866 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 868. In addition, short-range communication may occur, such as using a Bluetooth, WiFi, or other such transceiver (not shown). In addition, GPS (Global Positioning System) receiver module 870 may provide additional navigation- and location-related wireless data to device 850, which may be used as appropriate by applications running on device 850.

Device 850 may also communicate audibly using audio codec 860, which may receive spoken information from a user and convert it to usable digital information. Audio codec 860 may likewise generate audible sound for a user, such as through a speaker, e.g., in a handset of device 850. Such sound may include sound from voice telephone calls, may include recorded sound (e.g., voice messages, music files, etc.) and may also include sound generated by applications operating on device 850.

The computing device 850 may be implemented in a number of different forms, as shown in the figure. For example, it may be implemented as a cellular telephone 880. It may also be implemented as part of a smartphone 882, personal digital assistant, or other similar mobile device.

Device 850 may also include one or more different devices that are capable of sensing motion. Examples include, but are not limited to, accelerometers and magnetometers. Accelerometers and magnetometers, or other devices that are capable of detecting motion, orientation or position are available from any number of vendors and may sense motion in a variety of ways. For example, accelerometers may detect changes in acceleration while magnetometers may detect changes in orientation respective to the magnetic North or South Pole. These changes in motion may be detected by the device 850 and used to update the display of the respective devices 850 according to processes and techniques described herein.

Various implementations of the systems and techniques described here may be realized in digital electronic circuitry, integrated circuitry, specially designed ASICs (application specific integrated circuits), computer hardware, firmware, software, and/or combinations thereof. These various implementations may include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and may be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here may be implemented on a computer having a display device (e.g., a CRT (cathode ray tube) or LCD (liquid crystal display) monitor) for displaying information to the user and a keyboard and a pointing device (e.g., a mouse or a trackball) by which the user may provide input to the computer. Other kinds of devices may be used to provide for interaction with a user as well; for example, feedback provided to the user may be any form of sensory feedback (e.g., visual feedback, auditory feedback, or tactile feedback); and input from the user may be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user may interact with an implementation of the systems and techniques described here), or any combination of such back end, middleware, or front end components. The components of the system may be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications may be made without departing from the spirit and scope of the invention.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other embodiments are within the scope of the following claims.

What is claimed is:

1. A mobile computing device comprising:
   an accelerometer operable to provide a first input to an orientation module that is configured to use a plurality of signals to determine a spatial orientation of the mobile computing device;
   a magnetometer operable to provide a second input to the orientation module;
   the orientation module operable to:
   receive the first input from the accelerometer;
   receive the second input from the magnetometer;
   determine an angle of incidence of an axis of the mobile computing device compared to a plane, wherein the plane comprises a substantially vertical plane;

determine weightings of the first input and the second input, wherein the weightings are based on the angle of incidence;

as the angle of incidence is determined to indicate a change in the axis from more vertical orientation toward more horizontal orientation, increase the weighting of the second input relative to the first input; and determine an orientation of the mobile computing device based on a combination of the weighted first and second inputs;

a display operable to display content; and a display manager operable to present the displayed content with an orientation based on the determined orientation of the mobile computing device.

2. A mobile computing device comprising:

an accelerometer operable to provide a first input to an orientation module that is configured to use a plurality of signals to determine a spatial orientation of the mobile computing device; and a magnetometer operable to provide a second input to the orientation module;

the orientation module operable to:

receive the first input from the accelerometer;

receive the second input from the magnetometer;

determine an angle of incidence of an axis of the mobile computing device compared to a plane;

determine a first weighting of the first input and a second weighting of the second input, wherein the first weighting and the second weighting are based on the angle of incidence; and determine an orientation of the mobile computing device based on the first weighting and the second weighting;

a display operable to display content; and a display manager operable to rotate an orientation of the displayed content based on the determined orientation of the device.

3. The mobile computing device of claim 1, wherein the orientation module operable to determine the weightings is further operable to:

when the angle of incidence indicates the axis is substantially horizontal, then weight the second input 100%; and when the angle of incidence indicates the axis is substantially vertical, then weight the first input 100%.

4. The mobile computing device of claim 1, wherein the orientation module operable to determine the weightings is further operable to:

as the angle of incidence is determined to indicate a change in the axis from more horizontal orientation toward more vertical orientation, increase the weighting of the first input relative to the second input.

5. The mobile computing device of claim 1, wherein the orientation module operable to determine the weightings is further operable to:

determine a plurality of angles of incidence of an axis of the mobile computing device compared to a plurality of planes corresponding to the plurality of angles; and determine the weightings based on the plurality of angles of incidence.

6. A computer-implemented method comprising:

performing operations that, when executed by a computer, perform operations including:

receiving a first input from an accelerometer included in a mobile computing device;

receiving a second input from a magnetometer included in the mobile computing device;

determining an angle of incidence of an axis of the mobile computing device compared to a plane, wherein the plane comprises a substantially vertical plane;

determining weightings of the first input and the second input, wherein the weightings are based on the angle of incidence;

as the angle of incidence is determined to indicate a change in the axis from more vertical orientation toward more horizontal orientation, increasing the weighting of the second input relative to the first input;

determining an orientation of the mobile computing device based on a combination of the weighted first and second inputs; and causing a display on the mobile computing device to present the displayed content with an orientation based on the determined orientation of the mobile computing device.

7. The method of claim 6, wherein determining the weightings of the first input and the second input further comprises:

when the angle of incidence indicates the axis is substantially horizontal, then weighting the second input 100%; and when the angle of incidence indicates the axis is substantially vertical, then weighting the first input 100%.

8. The method of claim 5, wherein determining the weightings of the first input and the second input further comprises:

as the angle of incidence is determined to indicate a change in the axis from more horizontal orientation toward more vertical orientation, increasing the weighting of the first input relative to the second input.

9. The method of claim 6, wherein determining the weightings of the first input and the second input comprises:

determining a plurality of angles of incidence of an axis of the mobile computing device compared to a plurality of planes corresponding to the plurality of angles; and determining the weightings based on the plurality of angles of incidence.

10. The method of claim 6, further comprising:

receiving a plurality of first inputs from the accelerometer and a plurality of second inputs from the magnetometer at a plurality of angles of incidence;

comparing an accuracy of the plurality of first inputs to the plurality of second inputs in predicting an orientation of the mobile computing device at a plurality of angles of incidence of the device; and determining a set of weightings that correspond to the plurality of angles of incidence for each of the first input and the second input based on the comparison.

11. A non-transitory computer-readable medium having instructions encoded thereon, which, when executed by a processor, cause the processor to perform operations comprising:

receiving a first input from an accelerometer included in a mobile computing device;

receiving a second input from a magnetometer included in the mobile computing device;

determining an angle of incidence of an axis of the mobile computing device compared to a plane, wherein the plane comprises a substantially vertical plane;

determining weightings of the first input and the second input, wherein the weightings are based on the angle of incidence;

as the angle of incidence is determined to indicate a change in the axis from more vertical orientation toward more horizontal orientation, increasing the weighting of the second input relative to the first input;

determining an orientation of the mobile computing device based on a combination of the weighted first and second inputs; and causing a display on the mobile computing device to present the displayed content with an orientation based on the determined orientation of the mobile computing device.

12. The non-transitory computer-readable medium of claim 11, the operations further comprising wherein when the angle of incidence is determined to indicate the axis is substantially horizontal, then weighting the second input 100%; and when the angle of incidence is determined to indicate the axis is substantially vertical, then weighting the first input 100%.

13. The non-transitory computer-readable medium of claim 11, wherein the operations further comprise, as the angle of incidence is determined to indicate a change in the axis from more horizontal orientation to more vertical orientation, increasing the weighting of the first input relative to the second input.

14. The non-transitory computer-readable medium of claim 11, wherein determining the weightings of the first input and the second input comprises:

determining a plurality of angles of incidence of an axis of the mobile computing device compared to a plurality of planes that correspond to the plurality of angles; and determining the weightings based on the plurality of angles of incidence.

15. The non-transitory computer-readable medium of claim 11, wherein the operations further comprise:

receiving, at a plurality of angles of incidence, a plurality of first inputs from the accelerometer and a plurality of second inputs from the magnetometer;

comparing an accuracy of the plurality of first inputs to the an accuracy of the plurality of second inputs in predicting an orientation of the mobile computing device at a plurality of angles of incidence of the mobile computing device; and determining a set of weightings that correspond to the plurality of angles of incidence for each first input in the plurality of first inputs and each second input in the plurality of second inputs based on the comparison.

* * * * *

UNITED STATES PATENT AND TRADEMARK OFFICE
CERTIFICATE OF CORRECTION

PATENT NO. : 8,558,851 B1
APPLICATION NO. : 13/249562
DATED : October 15, 2013
INVENTOR(S) : Erick Tseng It is certified that error appears in the above-identified patent and that said Letters Patent is hereby corrected as shown below:

In the Claims:

Column 18, line 30, in Claim 8, delete "claim 5," and insert -- claim 6, --, therefor.

Column 20, line 17, in Claim 15, after "first inputs to" delete "the".

Signed and Sealed this
Twenty-eighth Day of January, 2014

Michelle K. Lee
*Deputy Director of the United States Patent and Trademark Office*